US007921203B2

(12) United States Patent
Brey et al.

(10) Patent No.: US 7,921,203 B2
(45) Date of Patent: Apr. 5, 2011

(54) SPECIFYING ASSOCIATIONS AMONG ATTRIBUTES OF ENTITIES IN

(75) Inventors: Thomas M. Brey, Cary, NC (US); Richard E. Harper, Chapel Hill, NC (US); William J. Piazza, Holly Spring, NC (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 11/755,981

(22) Filed: May 31, 2007

(65) Prior Publication Data

US 2008/0301279 A1 Dec. 4, 2008

(51) Int. Cl.
*G06F 15/173* (2006.01)
(52) U.S. Cl. ...................................................... 709/224
(58) Field of Classification Search .......... 709/223–226; 714/25, 27, 46; 706/18, 25, 15; 703/21, 703/13–15
See application file for complete search history.

(56) References Cited

U.S. PATENT DOCUMENTS

| | | | | |
|---|---|---|---|---|
| 5,838,919 | A * | 11/1998 | Schwaller et al. | 709/224 |
| 6,983,216 | B2 * | 1/2006 | Lam et al. | 702/119 |
| 7,103,874 | B2 | 9/2006 | McCollum et al. | |
| 7,181,523 | B2 * | 2/2007 | Sim | 709/226 |
| 7,478,151 | B1 * | 1/2009 | Maiocco et al. | 709/223 |
| 2004/0088406 | A1 * | 5/2004 | Corley et al. | 709/224 |
| 2004/0163001 | A1 | 8/2004 | Bodas | |
| 2005/0138440 | A1 | 6/2005 | Barr et al. | |
| 2005/0147047 | A1 * | 7/2005 | Monk | 370/241 |
| 2007/0005523 | A1 * | 1/2007 | Maren | 706/14 |
| 2007/0067678 | A1 * | 3/2007 | Hosek et al. | 714/25 |

OTHER PUBLICATIONS

Scadron; Temperature-Aware Microarchitecture: Modeling and Implementation; ACM Transactions on Architecture and Code Optimization; Mar. 2004; pp. 94-125; vol. 1, No. 1; University of Virginia; Charlottesville, Virginia, USA.

Mukherjee; Systematic Temperature Sensor Allocation and Placement for Microprocessors; Proceedings of the Design Automation Conference (DAC 2006); Jul. 24-28, 2006; pp. 542-547; vol. 33.2; San Francisco, California, USA.

Nookala; Temperature-Aware Floorplanning of Microarchitecture Blocks with IPC-Power Dependence Modeling and Transient Analysis; Proceedings of International Symposium on Low Power electronics (ISLPED '06); Oct. 4-6, 2006; pp. 298-303; Tegernsee, Germany.

(Continued)

*Primary Examiner* — Joseph E Avellino
*Assistant Examiner* — Chirag Patel
(74) *Attorney, Agent, or Firm* — H. Barrett Spraggins; Cynthia G. Seal; Biggers & Ohanian, LLP (57) ABSTRACT

Specifying associations among attributes of entities in a data center, the data center comprising a facility that houses computers and equipment supporting computer operations, the entities including the computers and the equipment, some attributes associated with a resource domain, the resource domain composed of a physical characteristic shared by some of the computers and equipment, including inducing, by a management module within the data center, a change in a value of a first attribute of a first entity; monitoring, by the management module within the data center, a change in a value of a second attribute of a second entity; determining whether the monitored change in the second attribute correlates with the induced change in the first attribute; and, if the monitored change in the second attribute correlates with the induced change in the first attribute, specifying an association among the first attribute, the second attribute, and the resource domain.

18 Claims, 7 Drawing Sheets

OTHER PUBLICATIONS

Shang; Thermal Modeling, Characterization and Management of On-chip Networks; Proceedings of the 37$^{th}$ International Symposium on Microarchitecture (MICRO-37'04); 2004; IEEE Computer Society.

McIntire; The Low Power Energy Aware Processing (LEAP) Embedded Networked Sensor System; Electrical Engineering Department, University of California; Los Angeles, California, USA.

\* cited by examiner

SPECIFYING ASSOCIATIONS AMONG ATTRIBUTES OF ENTITIES IN

BACKGROUND OF THE INVENTION

1. Field of the Invention

The field of the invention is data processing, or, more specifically, methods, apparatus, and products for specifying associations among attributes of entities in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which advances have been made is in management of data centers. Correlating a piece of data center equipment to one or more domains (power, thermal, network, SAN, etc) is important for the proper management of the computers and equipment in a data center. Some schemes rely upon manually entered data to state, for example, the physical location of the equipment (relates to the thermal domain) and which power domain it lies in. This information is likely to become out-of-date as equipment is moved, AC plugs are shuffled, and so on.

SUMMARY OF THE INVENTION

Methods, apparatus, and products are disclosed that provide automated ways of determining which resource domains a piece of equipment is associated with and to automatically validate that manually entered data regarding domain relationships are still valid. Methods, apparatus, and computer program products are disclosed for specifying associations among attributes of entities in a data center, where the data center is composed of a facility that houses computers and equipment supporting computer operations. The entities include the computers and the equipment, and at least some of the attributes are associated with a resource domain. The resource domain is composed of a physical characteristic shared by at least some of the computers and equipment. Embodiments typically include inducing, by a management module within the data center, a change in a value of a first attribute of a first entity; monitoring, by the management module within the data center, a change in a value of a second attribute of a second entity; determining whether the monitored change in the second attribute correlates with the induced change in the first attribute; and, if the monitored change in the second attribute correlates with the induced change in the first attribute, specifying an association among the first attribute, the second attribute, and the resource domain.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
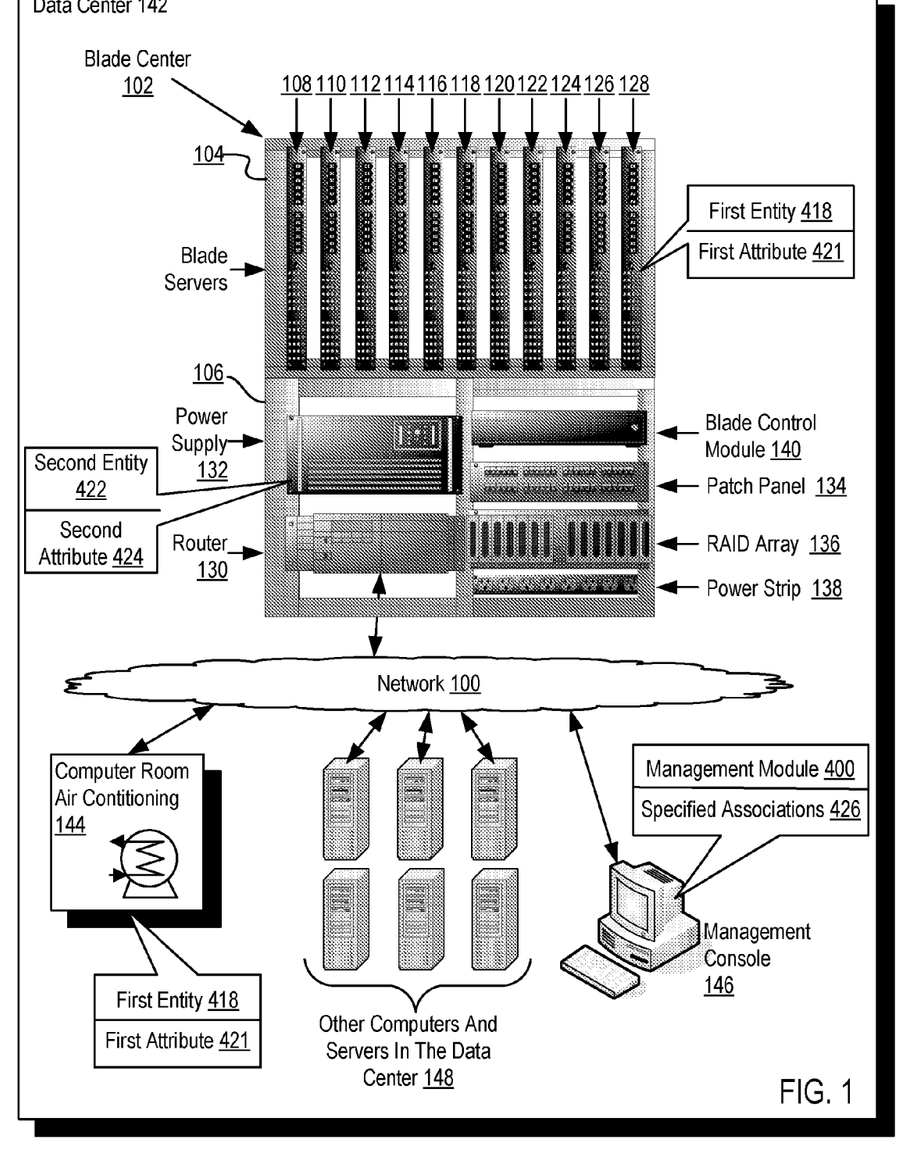
FIG. 1 sets forth a line drawing illustrating an exemplary data center that is configured for specifying associations among attributes of entities in a data center according to embodiments of the present invention.

Exemplary methods, systems, and products for specifying associations among attributes of entities in a data center according to embodiments of the present invention are described with reference to the accompanying drawings, beginning with FIG. 1. FIG. 1 sets forth a line drawing illustrating an exemplary data center (142) that is configured for specifying associations among attributes of entities in a data center according to embodiments of the present invention. The data center (142) is a facility that houses computers (108-128, 148) and equipment (132, 130, 140, 136, 144) supporting computer operations, each of which is an 'entity' in the data center. Each of the 'entities,' that is, each of the computers and items of equipment in the data center, has attributes such as, for example, temperature, power consumption, CPU usage, network connections, and so on. At least some of the attributers are associated with a 'resource domain,' where the resource domain is comprised of a physical characteristic shared by at least some of the computers and equipment, such as, for example, a thermal domain, a power consumption domain, a domain of network connection, and so on.

The data center of FIG. 1 includes a blade center (102), which contains computers in the form of blade servers as well as equipment supporting computer operations in the data center. The blade center (102) of FIG. 1 includes eleven blade servers (108-128) implemented in blade form factor and installed in a cabinet bay (104) of the blade center (102). The exemplary blade center (102) of FIG. 1 includes a blade control module (104). The blade control module (140) of FIG. 1 is a hot-swappable device that can be accessed through a management console (146) and used by a system administrator to configure and manage all components installed in the blade center (102). The blade servers (108-128) are coupled through the blade control module (140), the router (130), and the network (100) for data communications with the management console (146). The management console can read status information such as CPU usage rates and control processes on the blade servers (108-128) by use of data communications through the network (100), the router (130), and the blade control module (140).

In the exemplary blade center (102) of FIG. 1 the cabinet bay (106) includes, in addition to the blade control module (140), a power supply (132) that provides power to all components of the blade center (102), a data communications network router (130), a patch panel (134), a Redundant Array of Independent Disks ('RAID') (136), and a power strip (138). The power supply (132) may be intelligent or programmable; it may be, for example, a Power Distribution Unit ('PDU') or an Uninterruptable Power Supply ('UPS'). The association between a rack mounted server and the power supply, a PDU or a UPS, that it is connected to typically is not defined in advance but results from the specific routing of power circuits and line cords within the data center and the rack.

The power supply (132) in this example is coupled through router (130) and network (100) for data communications with the management console (146). The management console can read operating temperatures and power levels on the power supply by use of data communications through the network (100) and the router (130). In the system of FIG. 1, the power supply (132) and the blade control module (140) are housed in cabinet bays for purposes of clarity. Those of skill in the art will recognize, however, that the power supply and blade control module (140) may be embedded as part of the blade center (102) or be implemented in a system external to the blade center (102).

Computers and equipment of the data center are connected for data communications through network (100). The network (100) may be a local area network ('LAN'), a wide area network ('WAN'), a storage area network ('SAN'), a Fiber Channel network, an Infiniband network, and any combination of these different kinds of networks, as well as any other network as may occur to those of skill in the art. The computers and equipment in the data center also include a computer room air conditioning ('CRAC') unit (144) and a management console (146), as well as several other computers and servers (148). The CRAC unit (144) is coupled through network (100) for data communications with the management console (146). The management console can read and set temperature setting on the CRAC unit by use of data communications through the network (100). The other computers and servers (148) are illustrated as separate units, but readers will recognize that they often will be implemented as rack mounted computers or rack mounted servers such as 1Us, 2Us, 3Us, 4Us, 5Us, or 6Us. The association between an individual server or a rack mounted server and a power supply, a PDU or a UPS, or a CRAC unit typically is not defined in advance but results from the specific routing of power circuits and line cords within the data center and the rack.

The management console (146) in the example data center of FIG. 1 includes a management module (400). In this example, the management console (146) is implemented as a general purpose computer or workstation, and the management module (400) is implemented as a module of computer program instructions installed and running in random access memory and on a computer processor of the management console. This implementation of the management module running in random access memory and on a computer processor in a generally programmable computer is not a limitation of the present invention. A management module for specifying associations among attributes of entities in a data center according to embodiments of the present invention may be implemented as firmware, as hardware, in a programmable logic device such as a programmable logic array ('PLA'), a complex programmable logic device ('CPLD'), or a field programmable gate array ('FPGA'), as well as in other ways that will occur to those of skill in the art, and all such ways are well within the scope of the present invention.

In this example, the management module (400) operates generally to specify associations among attributes of entities in a data center by inducing a change in a value of a first attribute (421) of a first entity (418); monitoring a change in a value of a second attribute (424) of a second entity (422); determining whether the monitored change in the second attribute (424) correlates with the induced change in the first attribute (421); and if the monitored change in the second attribute correlates with the induced change in the first attribute, specifying an association (426) among the first attribute (421), the second attribute (424), and the resource domain.

The 'first entity' is any computer or other equipment in the data center having an attribute that the management module can directly affect. Such a first entity may be characterized as an 'inducing entity' because the management module induces a change in a value of a first attribute of the first entity and that change in turn induces changes in a value of a second attribute of a second entity associated with the first attribute through a resource domain. In this example, blade server (128) represents a first entity or inducing entity having a first attribute amenable to changes induced by the management module. The first attribute of the blade server is CPU utilization; the management module can read CPU utilization from the blade server (128), and the management module can launch CPU-intensive programs on the blade server, thereby inducing a change in the value of the first attribute, CPU utilization on the blade server.

The power supply (132) is an entity of a type that can be associated with a blade server through a power resource domain, so the changes in power output of the power supply are monitored by the management module as changes in a value of a second attribute of a second entity, the power supply being the second entity (422), the power output being the second attribute (424). If the power output of the power supply rises as CPU utilization rises, then the management module determines that the monitored change in the second attribute correlates with the induced change in the first attribute and specifies an association (426) among the first attribute (421), the second attribute (424), and the power resource domain. Similarly, an association may be specified upon determining a correlation between a decrease in power output and a decrease in CPU utilization, and associations also may be specified upon determining a correlation between specific patterns of increases and decreases over some period of time.

In this example, in addition to its function as a second entity in the power resource domain, the power supply serves as a second entity in a thermal resource domain also. In this example, CRAC unit (144) represents a first entity or inducing entity having a first attribute amenable to changes induced by the management module (400). The first attribute of the CRAC unit is its temperature setting; the management module can read the temperature setting from an electronic thermostat on the CRAC unit (144), and the management module can change the temperature setting on the electronic thermostat on the CRAC unit (144), thereby inducing a change in the value of the first attribute, temperature setting on the CRAC unit (144).

The power supply (132) is an entity of a type that can be associated with a CRAC unit through a thermal resource domain, so changes in the operating temperature of the power supply are monitored by the management module as changes in a value of a second attribute of a second entity, the power supply being the second entity (422), the operating temperature of the power supply being the second attribute (424). If the operating temperature of the power supply rises as the temperature setting on the CRAC unit rises, then the management module determines that the monitored change in the second attribute correlates with the induced change in the first attribute and specifies an association (426) among the first attribute (421), the second attribute (424), and the thermal resource domain.

The arrangement of blade servers, power supply, RAID array, power strip, and other devices making up the exemplary blade center, as well as the CRAC unit, the management console, and the other computers and servers illustrated in FIG. 1, is for explanation, not for limitation of the present invention. Computers and equipment in a data center for specifying associations among attributes of entities in a data center according to embodiments of the present invention may include additional computers, servers, or other devices, not shown in FIG. 1, as will occur to those of skill in the art. Networks in such data centers may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1. Other things, such as, for example, increased loading, can cause the power supply to increase in temperature and the methodology can account for them, for example, by subtracting off the temperature change expected due to these other factors. One way to exclude them is to monitor the temperature of the ambient air coming into a system which is directly controlled by the CRAC and not influenced by the internal operation of the system. And a pattern of increases and decreases that correlate over a period of time result in a good quality of associations.

Specifying associations among attributes of entities in a data center in accordance with the present invention is generally implemented with computers, that is, with automated computing machinery. In the system of FIG. 1, for example, the blade servers, the other computers and servers in the data center, the blade control module, the management console, and even the power supply and the CRAC unit are implemented to some extent at least as computers. For further explanation, therefore, FIG. 2 sets forth a block diagram of automated computing machinery comprising an exemplary computer (152) useful in specifying associations among attributes of entities in a data center according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer.

Figure 2:
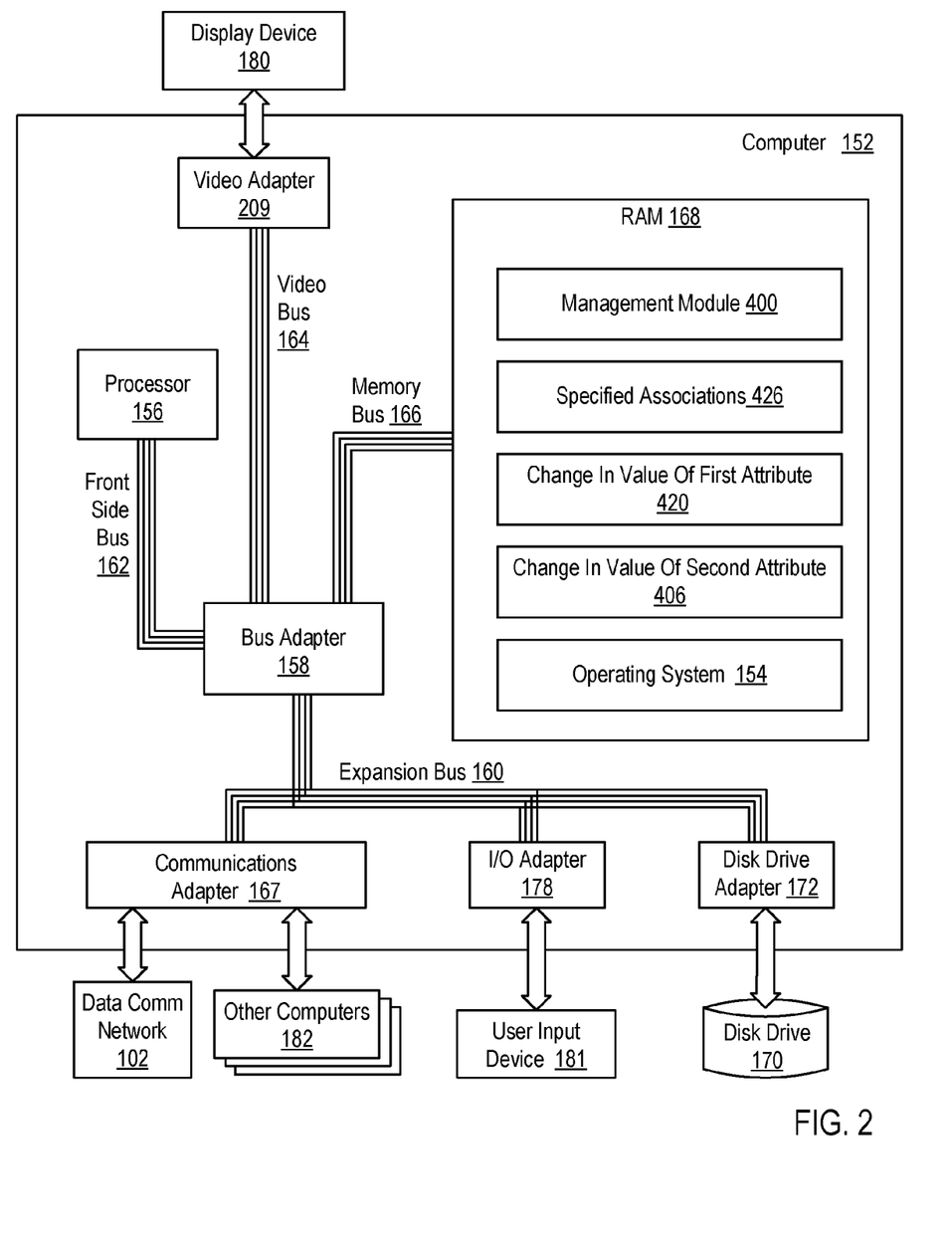
FIG. 2 sets forth a block diagram of automated computing machinery comprising an exemplary computer useful in specifying associations among attributes of entities in a data center according to embodiments of the present invention.

Stored in RAM (168) are a management module (400); data storage space (426) for specified associations among first attributes, second attributes, and resource domains; a data element (420) representing a change in a value of a first attribute of a first entity; and a data element (406) representing a change in value of a second attribute of a second entity. In this example, the management module (400) operates generally to specify associations (426) among attributes of entities in a data center by inducing a change (420) in a value of a first attribute of a first entity; monitoring a change (406) in a value of a second attribute of a second entity; determining whether the monitored change (406) in the second attribute correlates with the induced change (420) in the first attribute; and if the monitored change in the second attribute correlates with the induced change in the first attribute, specifying an association (426) among the first attribute, the second attribute, and the resource domain.

Also stored in RAM (168) is an operating system (154). Operating systems useful in computers for specifying associations among attributes of entities in a data center according to embodiments of the present invention include UNIX™, Linux™, Microsoft NT™, IBM's AIX™, IBM's i5/OS™, and others as will occur to those of skill in the art. The operating system (154), the management module (400), the specified associations (426), the change (420) in a value of a first attribute of a first entity, and the change (406) in value of a second attribute of a second entity in the example of FIG. 2 are shown in RAM (168), but many components of such software typically are stored in non-volatile memory also, for example, on a disk drive (170).

The exemplary computer (152) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in computers useful according to embodiments of the present invention include the Intel Northbridge, the Intel Memory Controller Hub, the Intel Southbridge, and the Intel I/O Controller Hub. Examples of expansion buses useful in computers useful according to embodiments of the present invention may include Peripheral Component Interconnect ('PCI') buses and PCI Express ('PCIe') buses.

The exemplary computer (152) of FIG. 2 also includes disk drive adapter (172) coupled through expansion bus (160) and bus adapter (158) to processor (156) and other components of the exemplary computer (152). Disk drive adapter (172) connects non-volatile data storage to the exemplary computer (152) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The exemplary computer (152) of FIG. 2 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The exemplary computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (102). Such data communications may be carried out through Ethernet™ connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for specifying associations among attributes of entities in a data center according to embodiments of the present invention include modems for wired dial-up communications, IEEE 802.3 Ethernet adapters for wired data communications network communications, and IEEE 802.11b adapters for wireless data communications network communications.

Figure 3:
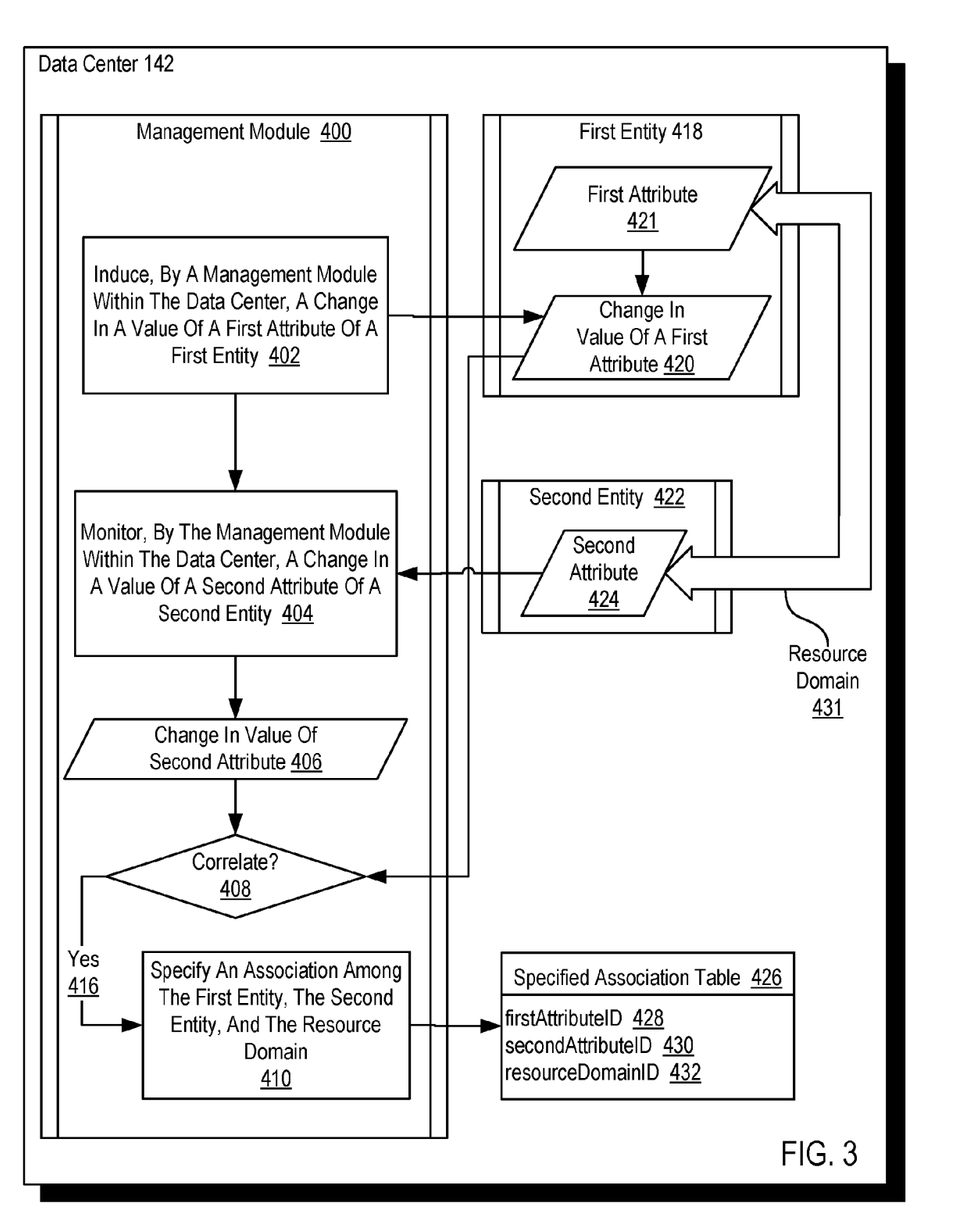
FIG. 3 sets forth a flow chart illustrating an exemplary method of specifying associations among attributes of entities in a data center according to embodiments of the present invention.

For further explanation, FIG. 3 sets forth a flow chart illustrating an exemplary method for of specifying associations among attributes of entities in a data center (142) according to embodiments of the present invention. The method of FIG. 3 is implemented in a data center, of the kind described above with regard to FIGS. 2 and 3, on computers and equipment supporting computer operations in the data center. The entities (418, 422) are items of the computers and equipment, at least some of the attributes are associated with a resource domain, and the resource domain (431) is a physical characteristic, such as temperature or power consumption, shared by at least some of the computers and equipment.

The method of FIG. 3 includes inducing (402), by a management module (400) within the data center (142), a change (420) in a value of a first attribute (421) of a first entity (418). The first entity (418) can be a computer in the data center, a component of a computer in the data center, a piece of equipment in the data center, or a component of a piece of equipment in the data center. Examples of first entities include servers, other computers, power supplies, CRAC units, and so on as will occur to those of skill in the art. The first entity (418) in this example is a computer or a piece of equipment in the data center having an attribute, here represented by the first attribute (421), that is amenable to control by the management module (400), so that the management module can induce changes in the attribute. The management module (400) may be implemented as a module of computer program instructions installed and running in random access memory and on a computer processor of a generally programmable computer, firmware, hardware, a PLA, a CPLD, an FPGA, as well as other implementations that will occur to those of skill in the art.

The method of FIG. 3 also includes monitoring (404), by the management module (400) within the data center (142), a change (406) in a value of a second attribute (424) of a second entity (422). The second entity (422) can be a computer in the data center, a component of a computer in the data center, a piece of equipment in the data center, or a component of a piece of equipment in the data center. Examples of second entities include servers, other computers, power supplies, CRAC units, and so on as will occur to those of skill in the art. The second entity (422) in this example is a computer or a piece of equipment in the data center having an attribute, here represented by the second attribute (424), that is amenable to monitoring by the management module (400), so that the management module can detect changes in the attribute.

The method of FIG. 3 also includes determining (408) whether the monitored change (406) in the second attribute correlates with the induced change (420) in the first attribute, and, if the monitored change (406) in the second attribute correlates (416) with the induced change (420) in the first attribute, specifying (410) an association (426) among the first attribute (421), the second attribute (424), and a resource domain (431). The resource domain (431) is shown in this illustration in a predetermined association with the first attribute (421) and the second attribute (431), but readers will recognize that at the beginning of any particular iteration of the method of FIG. 3, the management module does not know that the specified association exists. Instead of knowing that some predetermined association exists, the specified association is inferred, during operation of the method of FIG. 3, from the correlation (408, 416) of the changes (420, 406) in the values of the attributes (421, 424). The specified association in this example is represented by a data structure, specified association table (426). Each record of such a table would represent one specified association, and each record would have a field named firstAttributeID (428) that identifies the first attribute in a specified association, a field named secondAttributeID (430) that identifies the second attribute in a specified association, and a field named resourceDomainID (432) that identifies the resource domain in a specified association. The use of such a data structure (426) to represent specified associations is for explanation of the present invention, not a limitation of the present invention. In fact, specified associations may be represented in linked lists, arrays, C-style structs, and so on—as will occur to those of skill in the art.

Figure 4:
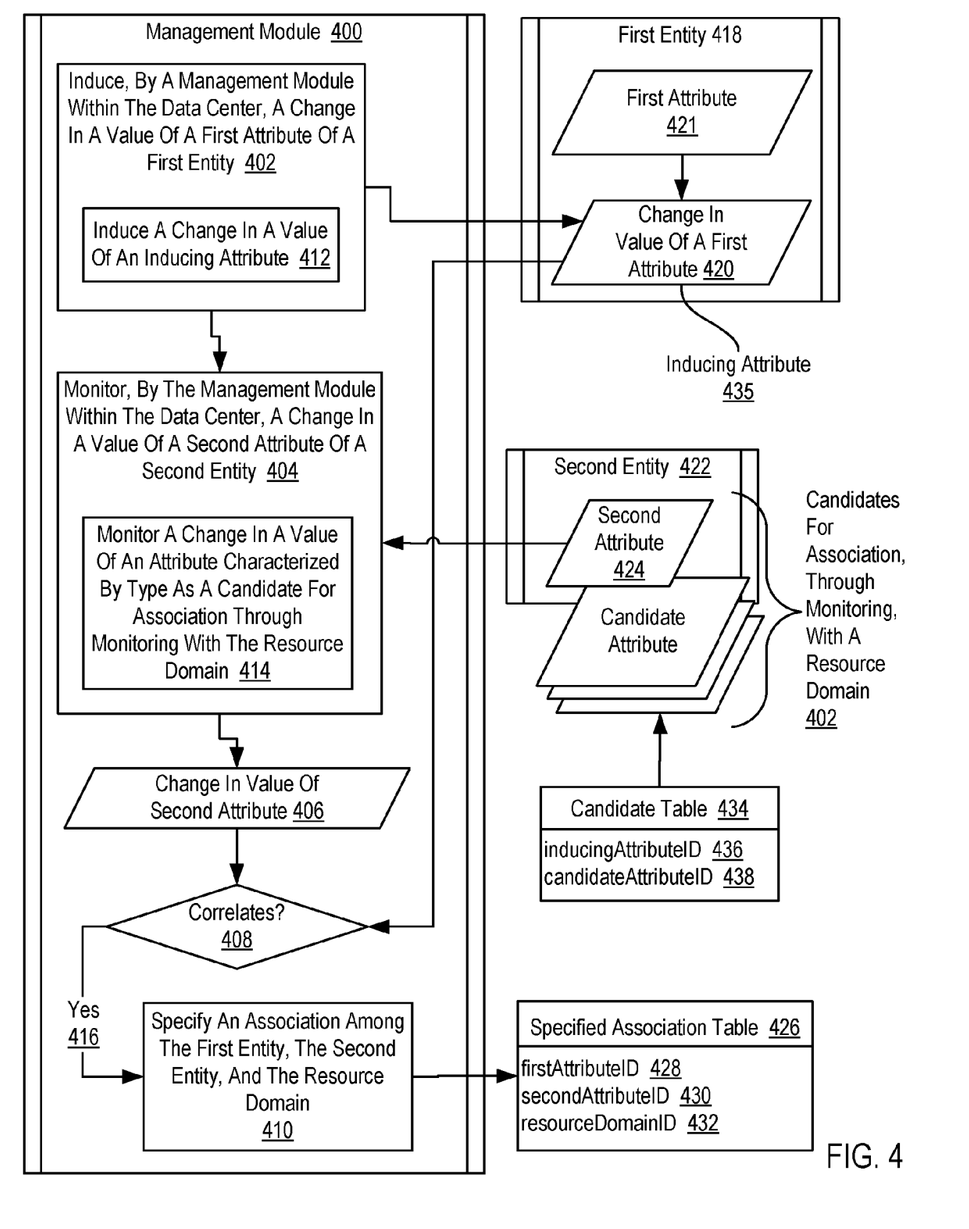
FIG. 4 sets forth a flow chart illustrating a further exemplary method of specifying associations among attributes of entities in a data center according to embodiments of the present invention.

For further explanation, FIG. 4 sets forth a flow chart illustrating a further exemplary method for of specifying associations among attributes of entities in a data center according to embodiments of the present invention. The method of FIG. 4 is similar to the method of FIG. 3, including as it does inducing (402) a change (420) in a value of a first attribute (421) of a first entity (418), monitoring (404) a change (406) in a value of a second attribute (424) of a second entity (422), determining (408) whether the monitored change (406) in the second attribute correlates with the induced change (420) in the first attribute, and, if the monitored change (406) in the second attribute correlates (416) with the induced change (420) in the first attribute, specifying (410) an association (426) among the first attribute (421), the second attribute (424), and a resource domain (431)—all of which operates generally as described above with regard to the method of FIG. 3.

In the method of FIG. 4, however, unlike the method of FIG. 3, at least one of attribute of an entity, including the first attribute (420), is characterized as an inducing attribute (435) for the resource domain; at least some attributes of the entities, including the second attribute (424), are characterized as candidates (402) for association, through monitoring, with the resource domain; inducing (402) a change in a value of a first attribute of a first entity includes inducing (412) a change in a value of an inducing attribute; and monitoring (404) a change in a value of a second attribute of a second entity includes monitoring (414) a change in a value of an attribute (424) characterized as a candidate for association, through monitoring, with the resource domain. Of course it is possible to configure the management module (400) to monitor values of all attributes of all entities in the data center every time the management module induces a change in any attribute of any entity. It may be more efficient in some embodiments, however, to only monitor changes in attributes that have some reasonable likelihood of being specified as associated, monitor changes in operating temperature when inducing changes in CRAC settings, monitor changes in current demand when inducing changes in CPU usage, for example.

In this example, an inducing attribute (435) is one that is amenable to control by the management module (400), so that the management module can induce changes in the attribute. Attributes (402) characterized as candidates (402) for association are those attributes that are amenable to monitoring by the management module (400), so that the management module can detect changes in the attribute. In this example, the attributes that are candidates for association are identified in a data structure, candidate table (434), along with inducing attributes with which they are reasonably likely to be specified as associated. Each record of such a table would represent a combination of an inducing attribute, in which changes in value may be induced, with an candidate attribute to be monitored for changes in value, and each record would have a field named inducingAttributeID (436) that identifies an inducing attribute and a field named candidateAttributreID (438) that identifies a corresponding candidate attribute. The use of such a data structure (434) to associate inducing attributes and candidate attributes is for explanation of the present invention, not a limitation of the present invention. In fact, such associations may be represented in linked lists, arrays, C-style structs, and so on—as will occur to those of skill in the art.

Figure 5:
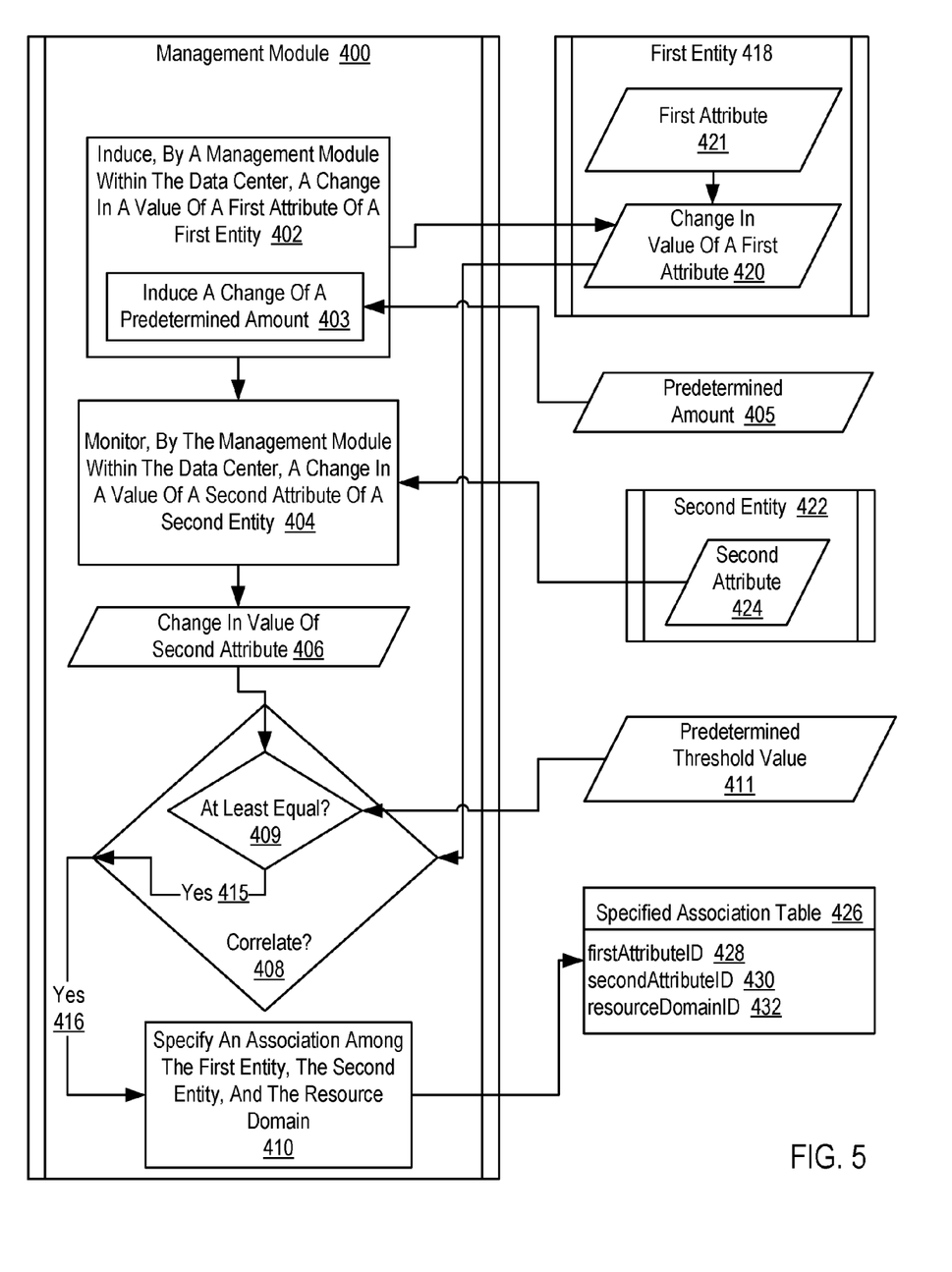
FIG. 5 sets forth a flow chart illustrating a further exemplary method of specifying associations among attributes of entities in a data center according to embodiments of the present invention.

For further explanation, FIG. 5 sets forth a flow chart illustrating a further exemplary method for of specifying associations among attributes of entities in a data center according to embodiments of the present invention. The method of FIG. 5 is similar to the method of FIG. 3, including as it does inducing (402) a change (420) in a value of a first attribute (421) of a first entity (418), monitoring (404) a change (406) in a value of a second attribute (424) of a second entity (422), determining (408) whether the monitored change (406) in the second attribute correlates with the induced change (420) in the first attribute, and, if the monitored change (406) in the second attribute correlates (416) with the induced change (420) in the first attribute, specifying (410) an association (426) among the first attribute (421), the second attribute (424), and a resource domain (431)—all of which operates generally as described above with regard to the method of FIG. 3.

In the method of FIG. 5, however, unlike the method of FIG. 3, inducing (403) a change (420) in a value of a first attribute (421) of a first entity (418) includes inducing (403) a change of a predetermined amount (405); and determining (408) whether the monitored change in the second attribute correlates with the induced change in the first attribute includes determining (409) whether the amount of the change (406) in the value of the second attribute is at least equal to a predetermined threshold value (411). Readers will recognize a relationship between the predetermined amount of the change induced in the first attribute and the predetermined threshold for change in the second attribute: In this example, without a change at least equal to the predetermined threshold value, it is not possible to determine that a correlation exists between the first attribute and the second attribute because the monitored change in the value (406) of the second attribute is, in effect, down in the noise.

Figure 6:
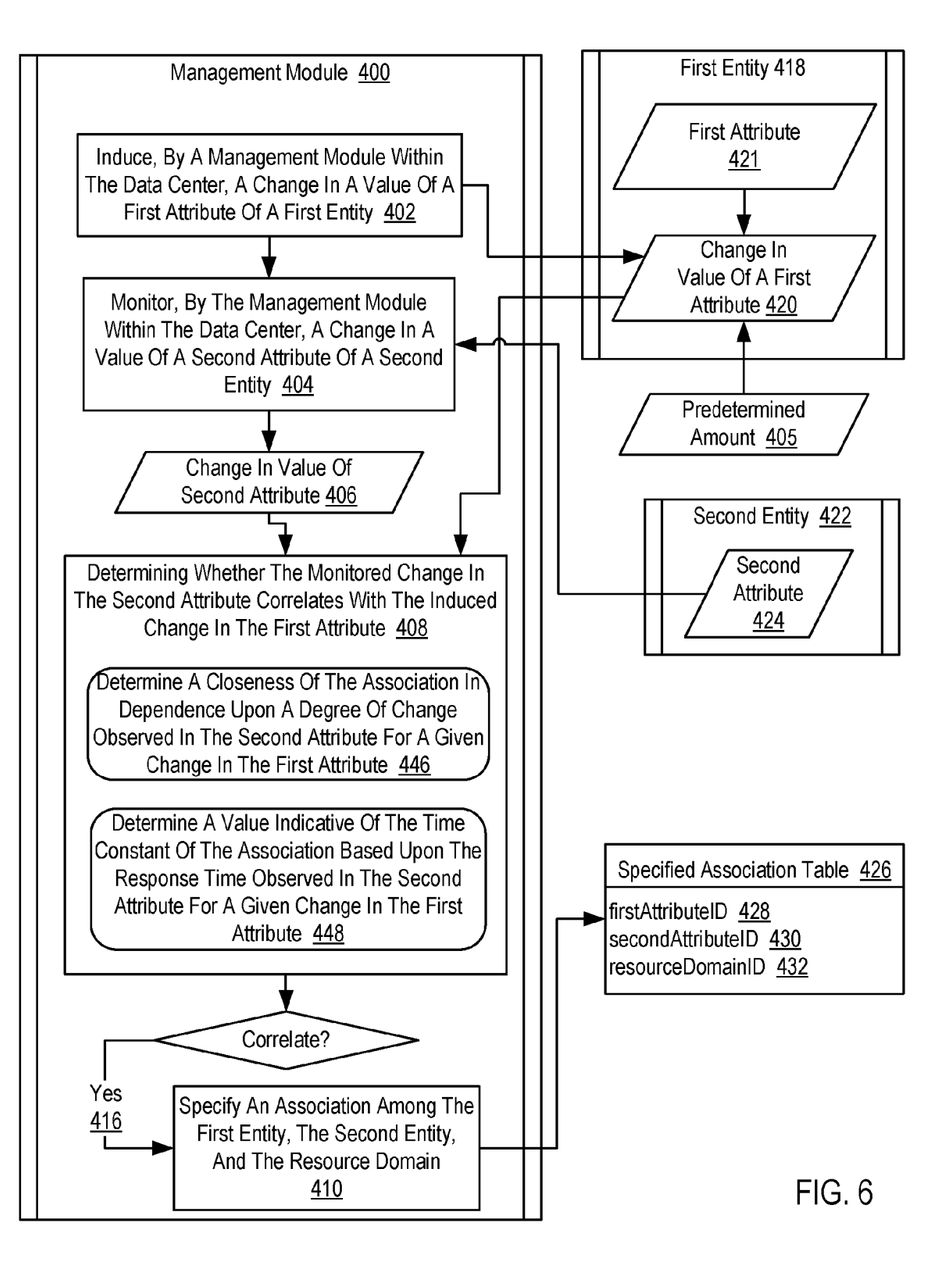
FIG. 6 sets forth a flow chart illustrating a further exemplary method of specifying associations among attributes of entities in a data center according to embodiments of the present invention.

For further explanation, FIG. 6 sets forth a flow chart illustrating a further exemplary method for of specifying associations among attributes of entities in a data center according to embodiments of the present invention. The method of FIG. 6 is similar to the method of FIG. 3, including as it does inducing (402) a change (420) in a value of a first attribute (421) of a first entity (418), monitoring (404) a change (406) in a value of a second attribute (424) of a second entity (422), determining (408) whether the monitored change (406) in the second attribute correlates with the induced change (420) in the first attribute, and, if the monitored change (406) in the second attribute correlates (416) with the induced change (420) in the first attribute, specifying (410) an association (426) among the first attribute (421), the second attribute (424), and a resource domain (431)—all of which operates generally as described above with regard to the method of FIG. 3.

In the method of FIG. 6, however, unlike the method of FIG. 3, determining (408) whether the monitored change in the second attribute correlates with the induced change in the first attribute includes the alternative step of determining (446) a closeness of the association in dependence upon a degree of change observed in the value (406) of the second attribute for a given change in the value (420) of the first attribute. As in the method of FIG. 5, the change in value of the first attribute (420) is known (405), so that when the monitored change in value of the second attribute becomes known, the ratio of the two is calculated by the management module (400). The larger the ratio of change in the second attribute to the change in the first attribute, the closer the management module determines the association to be. Consider an exemplary use case of a data center containing a power supply and two CRAC units, one CRAC unit closer to the server than the other CRAC unit. When the management module induces a change in the thermostat setting on the first CRAC unit of 5° F., the operating temperature of the power supply increases by 1° F. When the management module induces a change in the thermostat setting on the second CRAC unit of 5° F., the operating temperature of the power supply increases by 4° F. In this case, the management module is programmed to conclude that the power supply is more closely associated in the data center with the second CRAC unit, and, in specifying an association (410, 426) among a first attribute, a second attribute, and a resource domain, the management module will identify (428) the temperature setting on the second CRAC unit as the first attribute.

Also unlike the method of FIG. 3: In the method of FIG. 6, determining (408) whether the monitored change in the second attribute correlates with the induced change in the first attribute includes the additional alternative of determining (448) a time constant for the association based upon a response time observed in the change in value of the second attribute for a given change in the value of the first attribute. Now the management module has not only a ratio of change in the second attribute to the change in the first attribute, but also a timing of the change in the value of the second attribute. Consider a further exemplary use case of a data center containing a power supply and two CRAC units, one CRAC unit closer to the server than the other CRAC unit. When the management module induces a change in the thermostat setting on the first CRAC unit of 5° F., the operating temperature of the power supply increases by 5° F., taking three minutes to do so. When the management module induces a change in the thermostat setting on the second CRAC unit of 5° F., the operating temperature of the power supply increases by 5° F., taking one minute to do so. In this case, the management module is programmed to conclude that the power supply is more closely associated in the data center with the second CRAC unit, and, in specifying an association (410, 426) among a first attribute, a second attribute, and a resource domain, the management module will identify (428) the temperature setting on the second CRAC unit as the first attribute.

Figure 7:
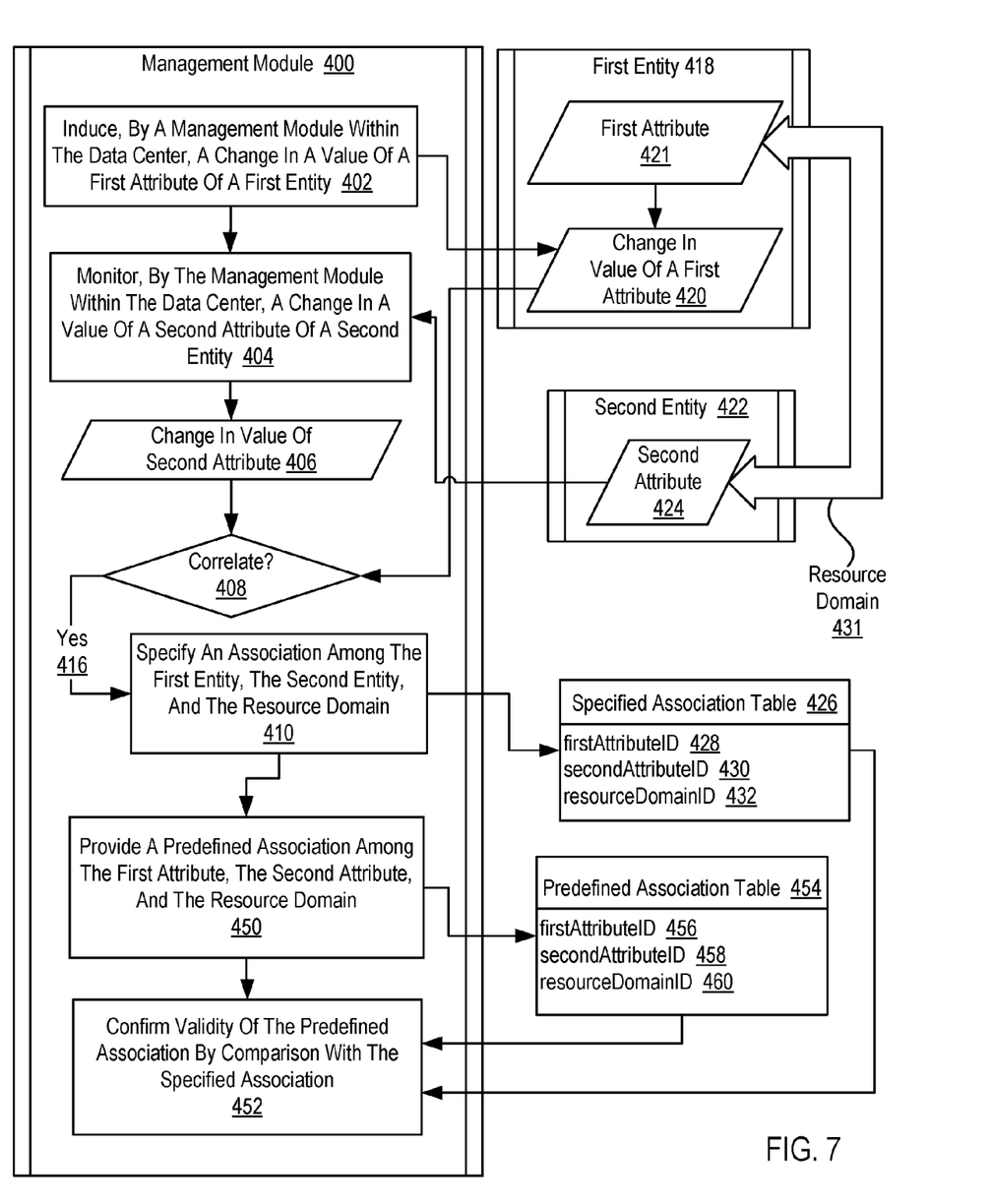
FIG. 7 sets forth a flow chart illustrating a further exemplary method of specifying associations among attributes of entities in a data center according to embodiments of the present invention.

For further explanation, FIG. 7 sets forth a flow chart illustrating a further exemplary method for of specifying associations among attributes of entities in a data center according to embodiments of the present invention. The method of FIG. 7 is similar to the method of FIG. 3, including as it does inducing (402) a change (420) in a value of a first attribute (421) of a first entity (418), monitoring (404) a change (406) in a value of a second attribute (424) of a second entity (422), determining (408) whether the monitored change (406) in the second attribute correlates with the induced change (420) in the first attribute, and, if the monitored change (406) in the second attribute correlates (416) with the induced change (420) in the first attribute, specifying (410) an association (426) among the first attribute (421), the second attribute (424), and a resource domain (431)—all of which operates generally as described above with regard to the method of FIG. 3.

The method of FIG. 7, however, unlike the method of FIG. 3, includes providing (450) a predefined association (454) among the first attribute (421), the second attribute (424), and the resource domain (431). The method of FIG. 7 also includes confirming (452) validity of the predefined association (454) by comparison with the specified association (426). Readers will recognize that the predefined associations (454) may be the normal operating table of associations of inducing attributes and monitored attributes in the data center, and that one of the benefits of the method of FIG. 7 is to provide a convenient and automated way of confirming the current correctness of associations in the normal operating table of associations—against the possibilities, for example, that equipment has been moved, power connections have been shifted, network connections have been altered, and so on. The predefined association in this example is represented by a data structure, specified association table (426). Each record of such a table would represent one predefined association, and each record would have a field named firstAttributeID (456) that identifies the first attribute in a predefined association, a field named secondAttributeID (458) that identifies the second attribute in a predefined association, and a field named resourceDomainID (460) that identifies the resource domain in a predefined association. The use of such a data structure (454) to represent predefined associations is for explanation of the present invention, not a limitation of the present invention. In fact, predefined associations may be represented in linked lists, arrays, C-style structs, and so on—as will occur to those of skill in the art.

Exemplary embodiments of the present invention are described largely in the context of a fully functional computer system for specifying associations among attributes of entities in a data center. Readers of skill in the art will recognize, however, that the present invention also may be embodied in a computer program product disposed on computer readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of specifying associations among attributes of entities in a data center, the data center comprising a facility that houses computers and equipment supporting computer operations, the entities comprising the computers and equipment, at least some of the attributes associated with a resource domain, the resource domain comprising a physical characteristic shared by at least some of the computers and equipment, the method comprising:
inducing, by a management module within the data center, a change in a value of a first attribute of a first entity, wherein the first entity is a physical machine and the first attribute represents a physical characteristic of the first entity;
monitoring, by the management module within the data center, a change in a value of a second attribute of a second entity, wherein the second entity is a physical machine and the second attribute represents a physical characteristic of the second entity;
determining whether the monitored change in the second attribute correlates with the induced change in the first attribute; and
if the monitored change in the second attribute correlates with the induced change in the first attribute, specifying an association among the first attribute, the second attribute, and the resource domain.

2. The method of claim 1 wherein:
at least one of attribute of an entity, including the first attribute, is characterized as an inducing attribute for the resource domain;
at least some attributes of the entities, including the second attribute, are characterized by type as candidates for association, through monitoring, with the resource domain;
inducing a change in a value of a first attribute of a first entity further comprises inducing a change in a value of an inducing attribute; and
monitoring a change in a value of a second attribute of a second entity further comprises monitoring a change in a value of an attribute characterized by type as a candidate for association through monitoring with the resource domain.

3. The method of claim 1 wherein:
inducing a change in a value of a first attribute of a first entity further comprising inducing a change of a predetermined amount; and
determining whether the monitored change in the second attribute correlates with the induced change in the first attribute further comprises determining whether the amount of the change in the value of the second attribute is at least equal to a predetermined threshold value.

4. The method of claim 1 wherein determining whether the monitored change in the second attribute correlates with the induced change in the first attribute further comprises determining a closeness of the association in dependence upon a degree of change observed in the value of the second attribute for a given change in the value of the first attribute.

5. The method of claim 1 wherein determining whether the monitored change in the second attribute correlates with the induced change in the first attribute further comprises determining a time constant for the association based upon a response time observed in the change in value of the second attribute for a given change in the value of the first attribute.

6. The method of claim 1 further comprising:
providing a predefined association among the first attribute, the second attribute, and the resource domain; and
confirming validity of the predefined association by comparison with the specified association.

7. Apparatus for specifying associations among attributes of entities in a data center, the data center comprising a facility that houses computers and equipment supporting computer operations, the entities comprising the computers and equipment, at least some of the attributes associated with a resource domain, the resource domain comprising a physical characteristic shared by at least some of the computers and equipment, the apparatus comprising a computer processor, a computer memory operatively coupled to the computer processor, the computer memory having disposed within it computer program instructions capable of:
inducing, by a management module within the data center, a change in a value of a first attribute of a first entity, wherein the first entity is a physical machine and the first attribute represents a physical characteristic of the first entity;
monitoring, by the management module within the data center, a change in a value of a second attribute of a second entity, wherein the second entity is a physical machine and the second attribute represents a physical characteristic of the second entity;
determining whether the monitored change in the second attribute correlates with the induced change in the first attribute; and
if the monitored change in the second attribute correlates with the induced change in the first attribute, specifying an association among the first attribute, the second attribute, and the resource domain.

8. The apparatus of claim 7 wherein:
at least one of attribute of an entity, including the first attribute, is characterized as an inducing attribute for the resource domain;
at least some attributes of the entities, including the second attribute, are characterized by type as candidates for association, through monitoring, with the resource domain;
inducing a change in a value of a first attribute of a first entity further comprises inducing a change in a value of an inducing attribute; and
monitoring a change in a value of a second attribute of a second entity further comprises monitoring a change in a value of an attribute characterized by type as a candidate for association through monitoring with the resource domain.

9. The apparatus of claim 7 wherein:
inducing a change in a value of a first attribute of a first entity further comprising inducing a change of a predetermined amount; and
determining whether the monitored change in the second attribute correlates with the induced change in the first attribute further comprises determining whether the amount of the change in the value of the second attribute is at least equal to a predetermined threshold value.

10. The apparatus of claim 7 wherein determining whether the monitored change in the second attribute correlates with the induced change in the first attribute further comprises determining a closeness of the association in dependence upon a degree of change observed in the value of the second attribute for a given change in the value of the first attribute.

11. The apparatus of claim 7 wherein determining whether the monitored change in the second attribute correlates with the induced change in the first attribute further comprises determining a time constant for the association based upon a response time observed in the change in value of the second attribute for a given change in the value of the first attribute.

12. The apparatus of claim 7 further comprising computer program instructions capable of:
providing a predefined association among the first attribute, the second attribute, and the resource domain; and
confirming validity of the predefined association by comparison with the specified association.

13. A computer program product for specifying associations among attributes of entities in a data center, the data center comprising a facility that houses computers and equipment supporting computer operations, the entities comprising the computers and equipment, at least some of the attributes associated with a resource domain, the resource domain comprising a physical characteristic shared by at least some of the computers and equipment, the computer program product comprising a non-transitory computer readable, recordable medium storing computer program instructions capable of:
inducing, by a management module within the data center, a change in a value of a first attribute of a first entity, wherein the first entity is a physical machine and the first attribute represents a physical characteristic of the first entity;
monitoring, by the management module within the data center, a change in a value of a second attribute of a second entity, wherein the second entity is a physical machine and the second attribute represents a physical characteristic of the second entity;
determining whether the monitored change in the second attribute correlates with the induced change in the first attribute; and
if the monitored change in the second attribute correlates with the induced change in the first attribute, specifying an association among the first attribute, the second attribute, and the resource domain.

14. The computer program product of claim 13 wherein:
at least one of attribute of an entity, including the first attribute, is characterized as an inducing attribute for the resource domain;
at least some attributes of the entities, including the second attribute, are characterized by type as candidates for association, through monitoring, with the resource domain;
inducing a change in a value of a first attribute of a first entity further comprises inducing a change in a value of an inducing attribute; and
monitoring a change in a value of a second attribute of a second entity further comprises monitoring a change in a value of an attribute characterized by type as a candidate for association through monitoring with the resource domain.

15. The computer program product of claim 13 wherein:
inducing a change in a value of a first attribute of a first entity further comprising inducing a change of a predetermined amount; and
determining whether the monitored change in the second attribute correlates with the induced change in the first attribute further comprises determining whether the amount of the change in the value of the second attribute is at least equal to a predetermined threshold value.

16. The computer program product of claim 13 wherein determining whether the monitored change in the second attribute correlates with the induced change in the first attribute further comprises determining a closeness of the association in dependence upon a degree of change observed in the value of the second attribute for a given change in the value of the first attribute.

17. The computer program product of claim 13 wherein determining whether the monitored change in the second attribute correlates with the induced change in the first attribute further comprises determining a time constant for the association based upon a response time observed in the change in value of the second attribute for a given change in the value of the first attribute.

18. The computer program product of claim 13 further comprising computer program instructions capable of:
providing a predefined association among the first attribute, the second attribute, and the resource domain; and
confirming validity of the predefined association by comparison with the specified association.

* * * * *